United States Patent [19]
Cardimona et al.

[11] Patent Number: 5,166,942
[45] Date of Patent: Nov. 24, 1992

[54] LASER LINE NARROWING AND FREQUENCY SHIFTING

[75] Inventors: David A. Cardimona; Athanasios Gavrielides; Phillip R. Peterson; Mohinder P. Sharma, all of Albuquerque, N. Mex.

[73] Assignee: The United States of America as represented by the Secretary of the Air Force, Washington, D.C.

[21] Appl. No.: 732,379

[22] Filed: Jul. 18, 1991

[51] Int. Cl.$^5$ .............................................. H01S 3/10
[52] U.S. Cl. ....................................... 372/21; 372/20; 372/28; 372/102; 372/10; 372/32; 372/19
[58] Field of Search ...................... 372/21, 28, 20, 10, 372/102, 32, 19, 26

Primary Examiner—Léon Scott, Jr.
Attorney, Agent, or Firm—Gerald B. Hollins; Donald J. Singer

[57] ABSTRACT

Multibeam coupling in a Kerr medium of nonlinear characteristics and finite response time is disclosed together with two different frequency spectrum examples of its use. In the first spectrum example, the modes are equally spaced and in the second spectrum the frequency separations are all unequal. In either case, as the beams propagate, both input spectra eventually reach a saturation characterized by a cascading of energy into the lowest frequency if the Kerr constant is positive. The direction of cascading of energy transfer is reversed to the highest frequency if the Kerr constant is negative. The examples disclosed include a typical Kerr medium and are representative of a multimode, equally spaced laser source and an unequally spaced source. For the equally spaced case, the optimum medium response time for conversion of Gaussian spectra is disclosed. If the frequencies are unequally spaced general conditions to be satisfied are disclosed, along with examples.

14 Claims, 4 Drawing Sheets

LASER LINE NARROWING AND FREQUENCY SHIFTING

RIGHTS OF THE GOVERNMENT

The invention described herein may be manufactured and used by or for the Government of the United States for all governmental purposes without the payment of any royalty.

BACKGROUND OF THE INVENTION

The present invention relates generally to the frequency shifting of optical energy as generated by a laser, for example, and more particularly to the accomplishment of such shifting to specific frequencies and at high efficiency using a moving grating material.

The present invention concerns a device capable of converting multimode or multi-beam laser systems into a single mode beam with near 100% efficiency. In a line narrowing configuration of the invention, a multimode laser beam of equally spaced frequencies is sent into a nonlinear material device having either a positive or negative Kerr constant. In the device, the energy in each laser mode is shifted up to the highest frequency for a negative Kerr constant, or down to the lowest frequency for a positive Kerr constant. In the frequency shifting configuration, a multiline laser beam or several laser beams of different frequencies are made incident on the device. Positive or negative Kerr constants are utilized to shift the beams up or down the mode ladder to the highest or lowest frequency.

In the line narrowing configuration of the invention therefore, one could send a multimode laser beam of equally spaced frequencies into a transducer which includes a nonlinear material having either a positive or a negative Kerr constant characteristic. In the positive or negative Kerr constant material, the energy in each laser mode is shifted up (for a negative Kerr constant) or down (for a positive Kerr constant) the mode ladder to the highest or lowest frequency of the input spectrum.

In the frequency shifting configuration therefore, either a multiline laser beam or several different laser beams of different frequencies would be incident on the nonlinear material. Shifting up in frequency would require a material having a negative Kerr constant. As the beam or beams exit the device, near 100% output at the highest or lowest frequency can be obtained. If the required frequency is not the highest or lowest input mode, but lies somewhere between, a power conversion into these frequencies is also possible.

Near 100% total input to total output power conversion occurs from multimode operation to single mode operation in the present invention. In conventional line-narrowing devices, such as filters and etalons, the power not in the desired single mode is merely discarded. However, in the present invention nonlinear device, power in the unwanted modes is actually shifted into the desired mode. The same device can be used in a laser frequency-shifting configuration. This device can also convert multimode or multi-beam systems into a single mode beam with near-100% efficiency, thus providing an efficient laser frequency tuning capability.

Most high-power laser output is multimode in nature. The many modes in such devices, however, tend to interfere and degrade the propagation and focusing properties of the beam. The device of the present invention provides an efficient means of conversion of such multimode output power into a single, very high power laser mode having diffraction-limited propagation and focusing properties.

The patent art indicates the presence of significant inventive activity relating to optical frequency shifting. Included in this art is the patent of P. B. Scott, U.S. Pat. No. 4,897,843 which describes a high speed broadband tunable laser system with multiple tuning elements. The Scott tuning elements comprise individual birefringent crystals which exhibit electro-optic effects when an electric field is applied. Two or more such elements provide coarse and progressively finer control over the wavelength and linewidth. The birefringent crystals are cut so as to have an optical transmission path which is roughly aligned with the Z-axis of the crystal. Two or more electrodes are positioned at opposite ends of the crystal. When a voltage is applied to the crystal, a frequency modifying phenomenon is obtained.

Also included in this art is the patent of J. F. Weller et al, U.S. Pat. No. 4,503,541 which relates to a controlled linewidth laser source in which the linewidth is controlled by reflecting a certain portion of the laser light back into the laser cavity. In the Weller et al apparatus, the active layer on an electroabsorptive cell is aligned with the active layer of a semiconductor laser on a single substrate, with a first waveguide therebetween. The first waveguide guides light from the laser to the electroabsorptive cell. The light absorption of the cell is electronically controlled. The laser light propagates through the active region in the electroabsorptive cell, and then a second waveguide guides the laser light to a reflection facet. The reflection facet reflects the laser light back through the waveguide-cell-waveguide-laser light path. The amount of light fed back depends on the absorption in the electroabsorption cell, which depends on the voltage applied to the cell. In this way, electronic control is achieved over the reflection process.

Additionally included in this art is the patent of K. Guers et al, U.S. Pat. No. 4,264,141 which describes a method and apparatus for frequency shifting a monochromatic narrow bandwidth light beam by means of the Doppler effect. The Guers et al apparatus comprises two stationary mirrors and two moving mirrors. The moving mirrors are arranged symmetrically about their axis of rotation, and staggered at a fixed angle of 180° on a rotating support. The beam is reflected back and forth between two locally fixed mirrors via the two moving mirrors. The directional alteration of the beam associated with the reflection from the first moving mirror is compensated by the reflection from the second moving mirror. The beam direction is reversed at the subsequent stationary mirror, and traverses the apparatus arrangement in the opposite direction and hits the surface of the second stationary mirror, and the beam is reversed again. This procedure is repeated for a number of light passages before the beam is coupled out of the apparatus.

Further included in this art is the patent of D. P. Hutchinson et al, U.S. Pat. No. 4,019,157 which relates to a method and apparatus for tuning high power lasers to a desired wavelength. The beam from a low power laser, which is lasing at the desired wavelength is injected into the high power laser through a small hole in the rear reflector of the high power laser. The injected signal from the low power laser overrides the spontaneous emission which normally starts laser oscillation, and locks the high power laser to the injection frequency.

Although these prior patents relate to systems and devices to control laser frequency, they do not describe a device which utilizes a nonlinear material with positive or negative Kerr constant to shift the laser frequency as described herein.

SUMMARY OF THE INVENTION

In accordance with the foregoing principles and objects of the invention, a mode shifting arrangement is described which comprises the use of a moving grating material as opposed to previously accomplished photorefractive shifting arrangements. The invention is characterized mathematically to obtain generalized results and shown to have input spectrum responsive characteristics which may be employed as advantages.

It is therefore a principal object of the invention to provide laser output energy of single mode characterization.

It is a further object of the invention to provide for the funneling of optical energy from several modes into a single selected low order or high order one of the modes.

It is a further object of the invention to utilize the properties of a nonlinear finite response time Kerr medium material to achieve high efficiency moving grating based optical energy mode shifting.

It is a further object of the invention to accomplish line narrowing and frequency shifting in a multimode environment.

These objects are achieved by a method for segregating one optical frequency component from the multiple components of an input beam comprising the steps of: communicating said multiple frequency componented input energy into a nonlinear refractory index moving grating Kerr media of predetermined finite response time and selected one of positive and negative Kerr constant characteristics, for propagation therein, and extracting energy of one optical frequency from the Kerr medium of a predetermined propagation distance along the length thereof.

These and other objects of the invention will become apparent as the detailed description of representative embodiments proceeds.

BRIEF DESCRIPTION OF THE DRAWINGS

The invention will be clearly understood from the following detailed description, of representative embodiments thereof read in conjunction with the accompanying drawings wherein.

DETAILED DESCRIPTION

Figure 1:
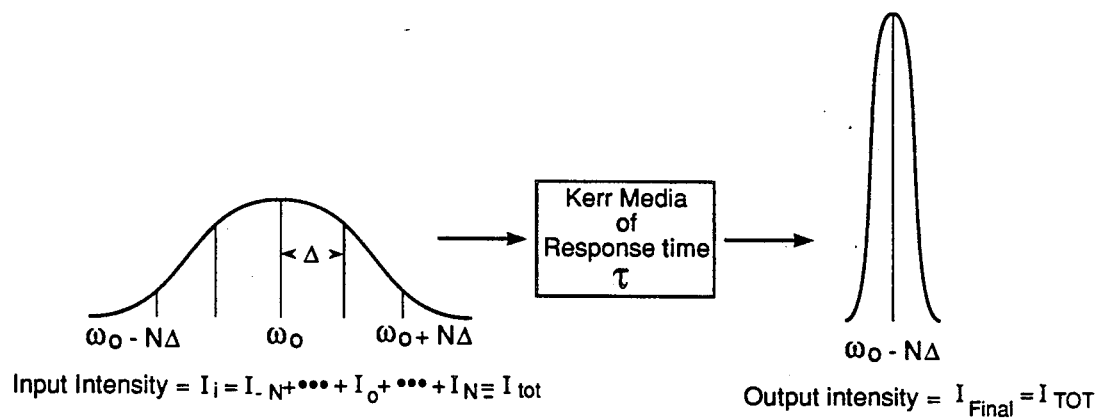
FIG. 1 shows a line narrowing or mode shifting embodiment of the invention.

Beam coupling is a currently active area of interest in the global technical community and involves the use of a nonlinear medium for the transfer of energy from one beam to another. Two-beam coupling has been studied both theoretically and experimentally in the past. In these studies the major thrust has been with the use of photorefractive materials as the nonlinear medium. The publications listed in references 1 and 2 herein describe these studies. The concept of using moving gratings in Kerr media for energy transfer was proposed in the seventies, however, experimental results were unreported until recently. The listings identified as references 3 and 4 herein describe these efforts. A comprehensive paper on two-beam coupling was published by Yeh as is disclosed in reference 5 herein. This paper shows the distinct differences between wave mixing achieved in photorefractive materials and in Kerr media. The crucial conditions for energy transfer in the latter Kerr media is that the beams have different frequencies and the Kerr media have a finite response time. These conditions are also stressed by Silverberg and Bar-Joseph in their reference 6 disclosed study of three-wave mixing in a Kerr medium. This work also concentrates on the instabilities which arise when the mixing occurs within a cavity.

The present disclosure describes multi-beam coupling wherein each beam is of a different frequency, and wherein the coupling is accomplished in a finite response time Kerr medium that is used in a co-directional configuration. The present invention differs from past beam coupling work in at least two respects. The present invention considers a multimode input condition that is an extension and generalization of the Stasel'ko et al work of reference 3. The present invention also considers conversion of multimode spectra in the presence of different medium response times. The disclosure presents several examples wherein multi-beam sources are converted into a single frequency.

In the present disclosure it is assumed that the time response of the nonlinear index of refraction medium obeys a Debye equation driven by an average intensity. The magnitude of the average intensity is obtained from the electric field E(z,t) which is represented by the plane wave expansion $\Sigma \{A_n(z) \exp(-i(\omega_n t - k_n z)) + $ c. c.$\}$ where:

z is in the propagation direction $A_n$ is the amplitude of the nth mode at frequency $\omega_n$.

i is the imaginary operator, $(-1)^{\frac{1}{2}}$ $\omega_n$ is the frequency $\tau$ is time $k_n$ is the wave vector magnitude ($\omega_n/c$, where c is the speed of light) and c. c. means complex conjugate.

The nondiffractive wave equation is reduced by employing the slowly varying envelope approximation to a set of coupled nonlinear first-order differential equations $\partial A_n/\partial z$, with $A_n(z=0)$ constituting the initial spectra.

Two physical situations are considered herein. First is the conversion of equally spaced spectra such as are found in longitudinal mode laser outputs or in Stark shifted spectra. The hallmark of this situation is the strong amplitude coupling present since many different field combinations can oscillate at any other frequency $\omega_n$. The second situation is characterized by unequally spaced spectra corresponding to for example, a laser output with several distinct transitions or even to separate lasers. Here, the coupling between various $A_n$'s associated with each frequency $\omega_n$, is through the intensities rather than the amplitudes. Regardless of the spectrum, the interaction eventually funnels all of the energy into the beam with the lowest frequency if the Kerr constant is positive; the direction of energy transfer is reversed — to the beam with highest frequency if the Kerr constant is negative.

The media saturation distance over which funneling occurs depends upon an interaction between several parameters. These parameters include the initial field spectrum, the presence of equal or unequal spacings in this spectrum and the relative intensities and phases of spectrum components. The parameters also include the $\Delta\omega\tau$ product of the mode spacing and the response time; and finally, the nonlinear coupling constant. Generally speaking the shortest saturation distance in the media occurs if the frequency difference between the lowest frequency mode, the one which eventually receives all the intensity, and the most intense mode is $\tau^{-1}$. For fixed $\Delta\omega\tau$, an equal spacing spectrum generally saturates before an unequal spacing spectrum if the two situations are otherwise similar. In all cases the initial relative phases have only a mild effect on the eventual conversion. However, over very short Kerr media distances, corresponding to an undepleted pump approximation, the initial field mode spectrum has a dramatic effect on conversion and can even inhibit energy transfer. This has been noted before by Silverberg and Bar-Joseph and effectively constitutes a check on the simulations referred to herein.

A representative equally spaced longitudinal laser output consisting of spaced lines with a relatively flat Gaussian intensity spectrum is considered herein. This is accomplished for two values of the product $\Delta\omega\tau$, a value of 0.3333, and a value of 1.0. The first value maximizes the gain or minimizes the saturation distance by making the mode separation between the last mode and the central mode equal to $1/\tau$. The second example shows that $\Delta\omega\tau$ is equal to one requires a longer conversion distance. The second example unequal spacing case is also modeled by a seven mode intensity spectrum with the consideration of two examples which illustrate the interaction of different $\Delta\omega\tau$ products and the initial intensity spectra. For either spectrum there are alternate physical situations which could be simulated; however, the following show the salient features including the eventual energy transfer.

Coupled Amplitude Equations

For the case in which several collinear plane waves of different frequencies propagate in a nonlinear Kerr material and all of the waves are assumed linearly polarized along the same direction, the nondiffractive wave equation can be written as:

$$\frac{\partial^2}{\partial z^2} E - \mu_0 \frac{\partial^2}{\partial t^2} D = 0 \quad (1)$$

where E is the electric field, D is the electric displacement, and $\mu_0$ is the permeability of free space. The nonlinear nature of the medium is taken into consideration through a constitutive relation between D and E. For a Kerr-like nonlinearity, a suitable relation is:

$$D = \epsilon_0(n_0 + n_{NL})^2 E \quad (2)$$
$$\approx \epsilon_0(n_0^2 + 2n_0 n_{NL}) E.$$

where $\epsilon_0$ is the vacuum permittivity, $n_0$ is the linear refractive index of the medium, and $n_{NL}$ is the nonlinear contribution to the refractive index. The nonlinear medium is assumed to be nonmagnetic, isotropic, and optically nonactive. It is, of course, the nonlinearity which brings about the transfer of energy from one beam to another.

The dynamic behavior of the nonlinear medium is modeled by assuming the nonlinear index obeys a Debye relaxation equation of the form:

$$\frac{\partial}{\partial t} n_{NL} + \frac{1}{\tau} n_{NL} = \frac{n_2}{\tau} |E|^2, \quad (3)$$

where $n_2$ is the Kerr constant and $\tau$ is the relaxation constant of the nonlinear material. The formal solution of this equation is:

$$n_{NL} = \frac{n_2}{\tau} \int_{-\infty}^{t} |E(t')|^2 e^{(t'-t)/\tau} dt'. \quad (4)$$

The electric field can be expanded into a series of plane waves as $$E(z,t) = \sum_m A_m(z) e^{i(K_m z - \omega_m t)} + c.c., \quad (5)$$

where $\omega_m$, $K_m$, and $A_m$ are the frequency, wavevector, and amplitude of the mth field. Here, the expansion coefficient $A_m$ is taken to be time-independent since only the steady-state response is of interest. Substituting this expression into the equation (4) formal solution for $n_{NL}$ yields $$n_{NL} = n_2 \sum_{m,n} \frac{A_m A_n^*}{1 - i\tau\omega_{mn}} e^{i(K_{mn}z - \omega_{mn}t)}, \quad (6)$$

where $\omega_{mn} = \omega_m - \omega_n$, $K_{mn} = K_m - K_n$, and n and m assume any integer values and the asterisk (*) indicates complex conjugate. Dispersion is ignored here since it is assumed that the index of refraction for the medium, $n_0 + n_{NL}$, is the same for each beam. It is to be noted that the terms with m=n in this summation produce a time-independent shift in the refractive index and that the terms with m≠n are holographic terms. The latter represent moving gratings which are shifted in phase as compared to the light interference pattern due to the complex factor $[1 - i\tau\omega_{mn}]^{-1}$. This phase shift is a consequence of the finite response time of the nonlinearity. Thus, if the energy is transferred the phase shift must be nonzero and this is true only when $\omega_{mn} \neq 0$ and $\tau \neq 0$.

The final step is to substitute the expression for $n_{NL}$ from Equation 6, into the wave Equation 1, and invoke the well-known slowly-varying envelope approximation. Completing these steps gives:

$$K_j \frac{dA_j}{dz} = \frac{-in_0n_2}{c^2} \sum_{lmn} (\omega_{mn} + \omega_l)^2 \frac{A_m A_n^* A_l}{1 - i\omega_{mn}\tau} e^{-i\phi}, \quad (7a)$$

$$j = 0, \pm 1, \pm 2, \ldots, \pm N$$

where m, n, and l run from $-N$ to $+N$ (with $2N+1$ being the number of mixing beams) and $\phi = (\omega_{mn} + \omega_{lj})t - (K_{mn} + K_{lj})z$. In Equation 7a only those terms for which $\phi = 0$ significantly contribute to the transfer of energy. If therefore, $\omega_{mn} + \omega_{lj} = 0$ and $K_{mn} + K_{lj} = 0$, equation 7a can be written as:

$$\frac{d}{dz} A_j = in_2 k_j \sum_{mnl} \frac{A_m A_n^* A_l}{1 - i\tau\omega_{mn}} \quad (7b)$$

where $k_j$ is the free-space wavevector for the jth field (i.e., $K_j = n_0 k_j$). Furthermore, in Equations 7a and 7b $$7b \sum_n |A_n|^2/\omega_n$$

is equal to a constant. Physically this simply says that in the absence of absorption the photon number is conserved in the mixing process. Also for the case of two-beam coupling, Equation 7b reduces to a set of equations identical to those found when studying Raman scattering.

In order to illustrate the structure of equation 7b three-beam coupling for equal and unequal spacing may be considered. If the frequency differences are equally spaced (i.e., $\omega_n = \omega_0 + n\Delta$, $n = 0, \pm 1$), then Equation 7b becomes:

$$\frac{d}{dz} A_- = \quad (8a)$$

$$in_2 k 2 \left[ IA_- + \frac{(A_0 A_+^* + A_- A_0^*) A_0}{1 - i\tau\Delta} + \frac{A_- A_+^* A_+}{1 - i2\tau\Delta} \right]$$

$$\frac{d}{dz} A_0 = in_2 k 2 \left[ IA_0 + \frac{(A_0 A_0^* + A_0 A_-^*) A_-}{1 + i\tau\Delta} + \quad (8b) \right.$$

$$\left. \frac{(A_- A_0^* + A_0 A_+^*) A_+}{1 - i\tau\Delta} \right]$$

$$\frac{d}{dz} A_+ = \quad (8c)$$

$$in_2 k 2 \left[ IA_+ + \frac{(A_+ A_0^* + A_0 A_-^*) A_0}{1 + i\tau\Delta} + \frac{A_+ A_-^* A_-}{1 + i2\tau\Delta} \right]$$

where $I = |A_-|^2 + |A_0|^2 + |A_+|^2$ and $k = 2\pi/\lambda$. Here the symbols "+", "0", and "−" represent the highest $n = +1$ mode, the $n = 0$ central mode, and the $n = -1$ lowest mode. Similarly, the equations for three unequally spaced beams (i.e., $\omega_{ij} = \omega_{kl}$ only when $i = k$ and $j = l$) can be obtained from equation 7 as:

$$\frac{d}{dz} A_- = in_2 k 2 \left[ IA_- + \frac{A_- A_0^* A_0}{1 + i\tau\omega_{-10}} + \frac{A_- A_+^* A_+}{1 + i\tau\omega_{-11}} \right] \quad (9a)$$

$$\frac{d}{dz} A_0 = in_2 k 2 \left[ IA_0 + \frac{A_0 A_-^* A_-}{1 + i\tau\omega_{0-1}} + \frac{A_0 A_+^* A_+}{1 + i\tau\omega_{01}} \right] \quad (9b)$$

$$\frac{d}{dz} A_+ = in_2 k 2 \left[ IA_+ + \frac{A_+ A_-^* A_-}{1 + i\tau\omega_{1-1}} + \frac{A_+ A_0^* A_0}{1 + i\tau\omega_{10}} \right] \quad (9c)$$

where, again, $I = |A_-|^2 + |A_0|^2 + |A_+|^2$ and $\omega_{1-1} = \omega_1 - \omega_{-1}$ and so forth. The main difference between these two sets of equations (8a–8c and 9a–9c) is the presence of amplitude coupling between the $\pm 1$ beams in the Equation 8 equal spacing set — in contrast to the intensity coupling in the Equation 9 unequal spacing set. Furthermore, the coupling between the $\pm 1$ beams in the unequal spacing set has a denominator larger in magnitude than that for the 01 beam coupling, the larger denominator term is, of course, less effective in the dynamics. It is the coupling to beams beyond merely the nearest neighbor that allows the initial phases to play a significant role in the energy transfer process.

The following examples emphasize the saturation properties of the two spectra. Thus, they do not in general consider the early growth, basically embodied in the unsaturated, undepleted pump regime. However, in the examples, the three mode undepleted analytic solution for the central mode is assumed much larger than the two side-band amplitudes. This is also repeated when the two outer modes were $\pi$ out of phase, a depleted pump no-growth situation, and the simulation results agree with the analytic solution in reference 6. A second check on the simulation is, of course, the conservation of photon number expressed as $\Sigma |A_n|^2/\omega_n = $ constant. In all cases, as the integration proceeds this quantity differs from its initial spectral value by less than 0.01%. The desire is not to present a specific laser and nonlinear Kerr material combination, but rather to show trends and thereby in effect disclose numerous realistic situations.

In a first example the representative system consists of two spectra, equal and unequal spacing, each with seven modes for two different $\Delta\omega\tau$ products of 0.333, and 1.0 — case 1 and case 2. In both modal cases the initial intensity spectra is relatively flat and given by a Gaussian with the additional constraint that the summation of intensity amplitudes $\Sigma |A(z=0)_n|^2 = 10.0$ MW/cm$^2$. The initial phases $\phi_n$ of the various amplitudes $A_n$ are determined by a random number generator on the interval $-\pi$ to $+\pi$. Consequently, the modal intensities, given in MW/cm$^2$, in all of the figures are averaged over 10 different initial random phase distributions, and the propagation distance is measured in centimeters. The nonlinear medium is carbon disulfide, CS$_2$, with a nonlinear index of refraction $n_2 = 1.0 \times 10^{-18}$ m$^2$/V$^2$ and a relaxation time $\tau$ in the neighborhood of $10^{-12}$ sec. The latter, not rigidly fixed in these examples, largely determines the dynamics for a given spectral distribution.

In these examples there are clear trends which can be extracted from the two mode solutions. For example, if $n_2$ or the intensity I, where $I = \Sigma |A_n|^2$, decreases then all of the curves in the FIGS. 1b and 1c move out to larger "saturation" distances or z values, thus keeping the product $n_2 Iz$ equal to a constant. Note, however, that if I changes spectral intensity $I_n$ must be scaled the same. This necessity can be seen, for example, from Equation 8. If, however, the relative intensities are all changed differently then the conversion can change dramatically. This is intimately coupled to the $\Delta\omega\tau$ product for both spectra.

This coupling can be easily illustrated by again turning to the two mode solution for guidance. It has been shown that the spectral gain is proportional to $(\Delta\omega\tau)I$ $n_2z/(1+(\Delta\omega\tau)^2)$ where I $=I_1+I_2$, which peaks for $\Delta\omega\tau=1$. Now this reasoning is applied to the case of equal spacing $\Delta$, and Gaussian distributed intensities, to obtain a plausible maximum extraction condition. If the separation between the $-N$ mode, which eventually receives all the energy, and the central mode, the most intense in a Gaussian distribution, is $\omega_{-N,0}$ and $\omega_{-N,0}\tau=1$ where $\omega_{-N,0}=\Delta(N-1)/2$, then the conversion is the most efficient — that is, more energy is funneled into $A(-N)$ in the shortest distance. These arguments agree with simulations and give the optimal relationship between a Gaussian distributed spectra and the $\Delta\omega\tau$ product in order to insure a rapid conversion. Any other relation between these quantities requires longer conversion lengths. However, if $(2N+1)\Delta\tau>1$ the conversion is always weak since in that case $\Delta\omega\tau$ can never equal one. For an arbitrary intensity spectra it is difficult to predict the best $\Delta\int\tau$ product.

Figure 1A:
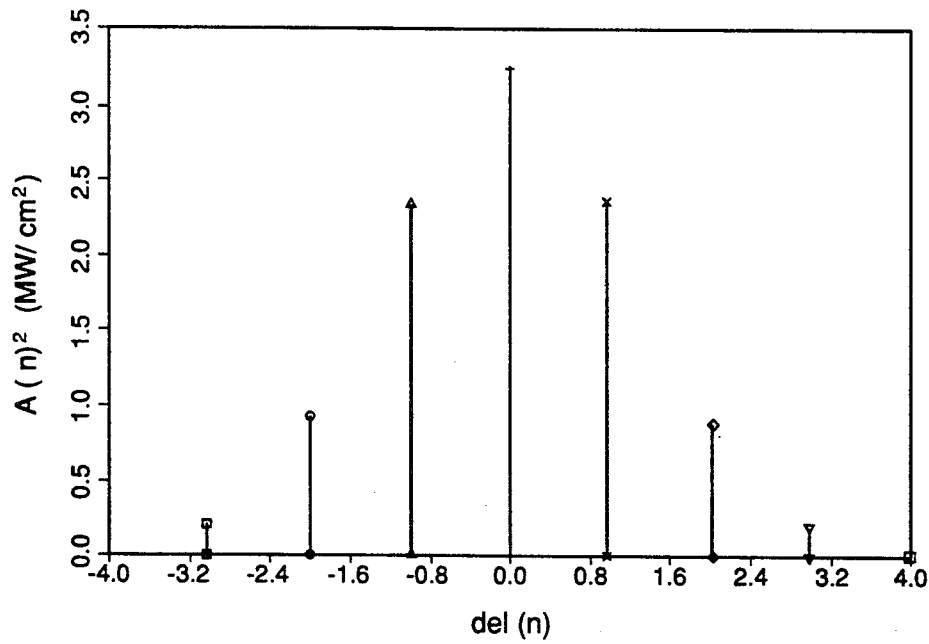
FIG. 1a shows a Gaussian equally spaced input spectrum example for the FIG. 1 embodiment.

FIG. 1 shows a line narrowing arrangement of the invention. The related simulation in FIG. 1a shows the initial intensity spectrum for the equally spaced frequency example and a total input intensity of 10 MW/cm$^2$. FIG. 1a therefore shows the intensity of each mode in MW/cm$^2$ as a function of the propagation distance z. In FIG. 1a, N has a value of 7, $\Delta\omega\tau=0.5$, and $n_2$ is $10^{-18}$ average. Additionally in FIG. 1 an equally spaced frequency source, such as that produced by a multimode longitudinal moded laser with mode spacing $\Delta$, with total incident intensity $I_{tot}=I_i-I_{-N}+\ldots I_0+ +I_N$ distributed over $(2N+1)$ modes is incident on a Kerr media of finite response time $\tau$. At the exit all the incident intensity has been transferred to the lowest mode or frequency at $\omega_0-N\Delta$, if the Kerr constant is positive.

Figure 1B:
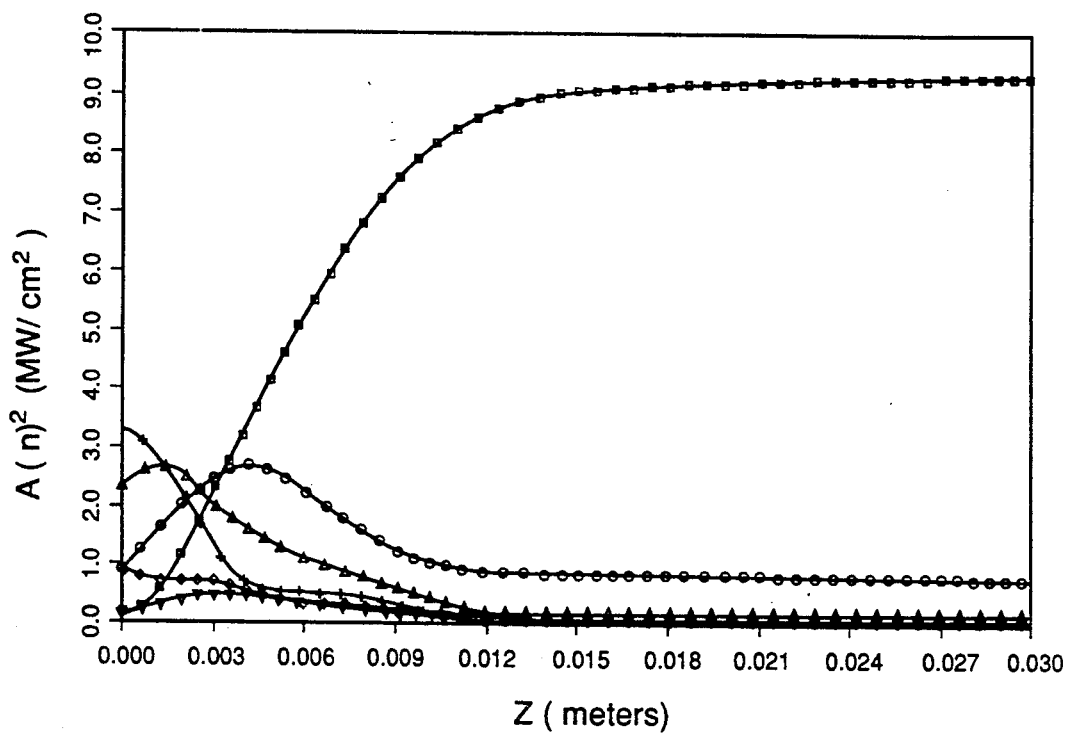
FIG. 1b shows a plurality of modal intensity versus propagation distance relationships for the FIG. 1a spectrum and a 0.333 value of the $\Delta\omega\tau$ mode spacing/response time product.
Figure 1C:
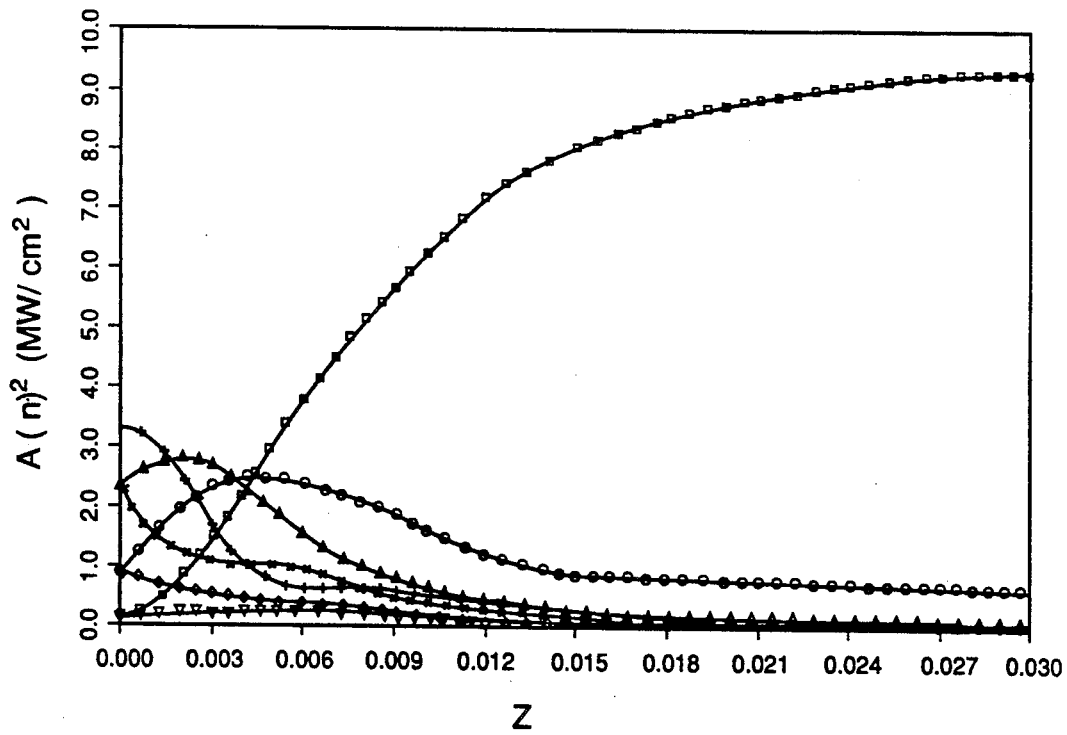
FIG. 1c shows a plurality of modal intensity versus propagation distance relationships for the FIG. 1a spectrum and a 1.0 value of the $\Delta\omega\tau$ mode spacing/product response time product.

The two subsequent figures, FIGS. 1b and 1c, show the seven equally spaced modal intensities in MW/cm$^2$ as a function of the Kerr media propagation distance z, for $\Delta\omega\tau=0.333$, and $\Delta\omega\tau=1.0$, respectively, with the other parameters remaining the same as in FIG. 1a. FIG. 1b illustrates that the shortest "saturation" distance or conversion length occurs when separation between the $n=-3$ mode and the central mode is unity, that is, $\omega_{-3,0}=3\Delta=1/\tau$. This is contrasted to the conversion for $\Delta\omega\tau=1$, shown in FIG. 1c, which is held off in comparison to the previous figure. In addition to the conversions shown in FIGS. 1b and 1c, if $\Delta\omega\tau=0.5$, giving the separation $\omega_{-3\tau-1}=1$, the simulation looks similar to FIG. 1b except that the conversion is slightly held-off. This is to be expected because, as can be determined from FIG. 1b, $|A(0)|^2/A(-1)|^2=1.4$ and thus the $-3$ mode is still coupled to a relatively intense $-1$ mode. For a $\Delta\omega\tau$ of less than 0.33 the coupling is again weak and conversion proceeds more slowly. Finally, for a $\Delta\omega\tau$ of greater than 1 the conversion is similar to that shown in FIG. 1c except that the cross-over is moved out to 0.004 meters or 0.4 cm, a factor of 10 larger than the $\Delta\omega\tau=1$ cross-over at z=0.04cm. From simulations it is found that rapid conversion into the lowest mode occurs only after all modes have about the same intensity. In FIG. 1b this occurs at the z=0.3 cm position.

Figure 2:
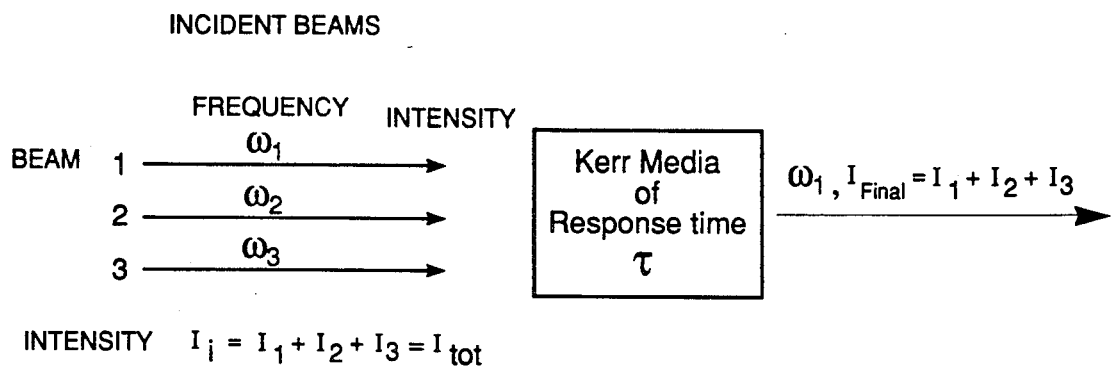
FIG. 2 shows a frequency shifting embodiment of the invention.
Figure 2A:
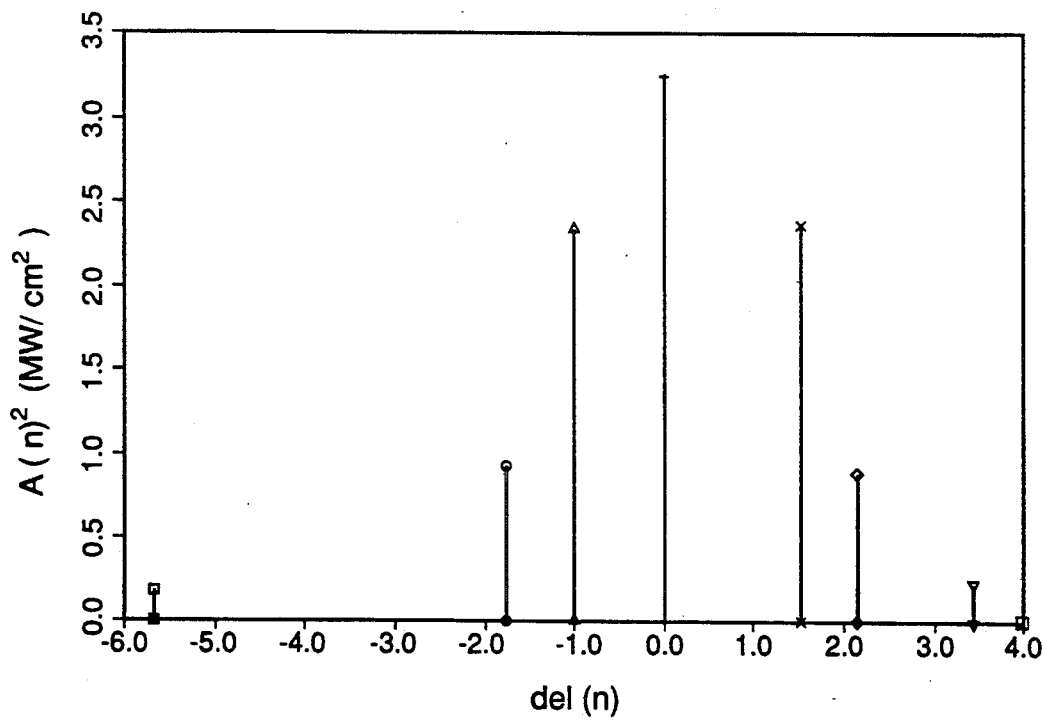
FIG. 2a shows the intensity of each mode as a function of propagation distance for a non-equally spaced seven-mode input spectra for the FIG. 2 embodiment.
Figure 2B:
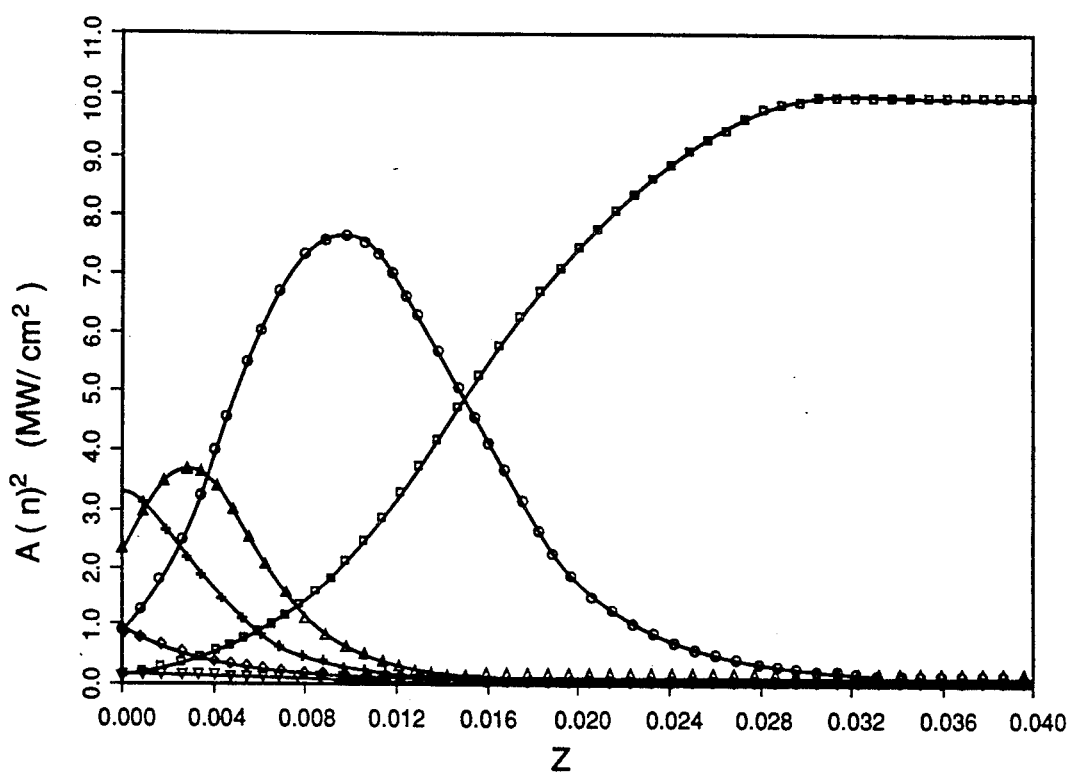
FIG. 2b shows energy extraction versus propagation distance for the FIG. 2a unequal spacing input for a $\tau$ having a value of $1 \times 10^{-12}$ seconds.
Figure 2C:
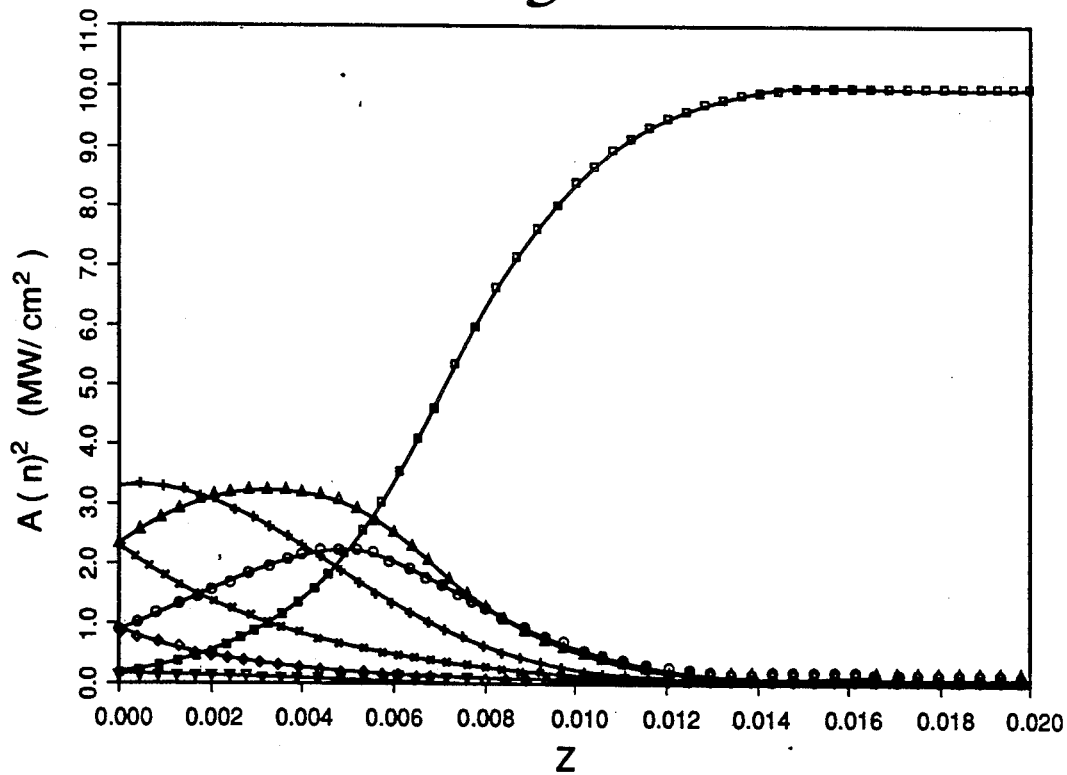
FIG. 2c shows energy extraction versus propagation distance for the FIG. 2a unequal spacing input and $\tau$ having a value of $1/(\omega_{0,-3})$.

A frequency shifting arrangement of the invention is shown in FIG. 2 and an example of unequal spacing for use in the FIG. 2 system is shown in the related FIG. 2a. In FIG. 2 three beams having, for example, unequal frequency spacing with $\omega_1-\omega_2\neq\omega_3-\omega_2$, and with total incident intensity $I_i=I_1+I_2+I_3$ are incident on a Kerr media with a finite response time. At the exit there is only one frequency with all the incident intensity transferred into it. This example is for a negative Kerr constant. The FIG. 2a particular spectrum is chosen to illustrate the role of the $\Delta\omega\tau$ product on conversion. Specifically, the frequency differences or detunings are: $\omega_{-3,0}=-5.7$, $\omega_{-2,0}=-1.8$, $\omega_{-1,0}=-1.0$, $\omega_{1,0}=1.5$, $\omega_{2,0}=2.1$, $\omega_{3,0}=3.4$, all measured in $10^{12}$/sec. FIG. 2a shows the initial individual intensities which have the same relative values as before and, again, sum to 10.0 MW/cm$^2$. Inserting these initial conditions in Equation 7b and integrating gives the curves of FIGS. 2b and 2c. FIG. 2b shows the extraction for $\tau=1.0\times10^{-12}$ seconds with N=7, $\Delta\omega\tau=2.21$ and $n_2=10^{-18}$. The dominant feature in this instance is the cascading of the intensity down through the intervening orders until the $-N$ order saturates. That is, the $-1$ order grows and then as it depletes, the $-2$ order grows and so forth until all the intensity resides in the final lowest order. In the equal spacing case this effect was not nearly as pronounced. This suggests that it is possible to select a particular frequency by extracting the beam after a certain propagation distance. In FIG. 2c $\tau$ is chosen to equal $1/\omega_{0,-3}$ or $1/5.7\times10^{-9}$, thus maximizing the gain between the central mode and the $-3$ mode; all of the other parameters in FIG. 2c remain as in FIG. 2b. This figure shows the hastening of the conversion as is to be expected, in comparison with the previous conditions. These two examples also suggest the difficulty in presenting general rules concerning conversion for unequal spacing.

Conclusions

Characteristics of the dynamic behavior resulting when several beams of different frequency content mix in a Kerr medium of finite response time have been disclosed. For a medium with a positive Kerr constant, energy is transferred to the lowest frequency mode. If the medium has a negative Kerr constant, the energy is transferred to the highest frequency mode. When the frequency differences between the various beams are equally spaced, the optimal conditions for conversion of the Gaussian distributed intensities can be obtained and conversion generally occurs after the intervening modes have about the same intensities. When the frequency differences are unequally spaced, then one mode interacts substantially only with its next lowest neighbor. These two effects can be enhanced or degraded depending upon the relationship between mode spacing, intensities, and the medium relaxation time.

If frequency differences are equally spaced and lie under a Gaussian envelope, then the nonlinear mixing process generally shifts the intensity from the central mode to the side mode at $(\omega_0-N\Delta)$. If the frequency differences are unequally spaced, then the mixing produces an intensity cascade through each subsequent mode that is characterized by a growth followed by a depletion. If the process is stopped at various propagation distances a large portion of the total energy can be trapped in a particular side mode. However, in all cases, given enough propagation distance, the process will saturate.

The disclosed invention can be advantageously employed in a number of laser related uses, for example. Included in these uses is the generation of single mode laser energy as is desirable in spectroscopy work, the combination or transfer of output energy from several lasers into a single laser frequency output, improved communications systems using laser-based energy and improvement of the efficiency of lasers used in welding, medical, and military systems. Additionally, since the development of current and future lasers depends on understanding the gain medium's atomic or molecular energy level structure, the device of the present invention enhances the spectroscopic study of these levels, since it provides an efficient way of tuning a probe laser into resonance with these levels.

While the apparatus method herein described constitute a referred embodiment of the invention, it is to be understood that the invention is not limited to this precise form of apparatus or method and that changes may be made therein without departing from the scope of the invention which is defined in the appended claims.

REFERENCES

1. V. L. Vinetskii, N. V. Kukhtarev, S. G. Odulov, and M. S. Soskin, Soviet Physics Ups. 22 742 (1979); N. V. Kukhtarev, V. B. Marko, S. G. Odulov, M. S. Soskin, and V. L. Vinetskii, Ferroelectrics 22, 961 (1979); Y. H. Ja, Optical Quantum Electronics 14, 547 (1982); P. Yeh, Optical Communications 45, 323 (1983); D. Pak, I. Ledoux, and J. P. Buignard, Optical Communications 49, 302 (1984); P. Yeh, JOSA B 4, 1382 (1987).

2. A. E. T. Chiou, P. Yeh, Optical Letters 10, 621 (1985).

3. D. I. Stasel'ko and V. G. Sidorovich, Soviet Physics — Technical Physics 19, 361 (1974); V. G. Sidorovich and D. I. Stasel'ko, Soviet Physics — Technical Physics 19, 1593 (1975); Y. Anan'ev, Soviet Journal of Quantum Electronics 4, 929 (1975).

4. G. Grynberg, E. LeBihan, and M. Pinard, J. Physique 47, 1321 (1986); M. T. Gruneisen, K. R. MacDonald, A. L. Gaeta, R. W. Boyd, and D. J. Harter, submitted to Physical Review A (1989).

5. P. Yeh, IEEE Journal of Quantum Electronics QE-25. 484 (1989).

6. Y. Silverberg and I. Bar-Joseph, JOSA B 1, 662 (1984).

7. P. Alsing, P. R. Peterson, D. A. Cardimona and A. Gavrielides, IEEE Journal of Quantum Electronics QE-3, 557 (1987).

We claim:

1. The method for coupling input laser optical beam energy of differing frequency content into an intensity conserved single frequency output beam comprising the steps of:

communicating said multiple frequency input energy into a nonlinear refraction index moving grating Kerr medium of predetermined finite response time and selected one of positive and negative Kerr constant characteristics, for propagation therein;

said Kerr medium being also characterized by the mathematical relationship $$\frac{d}{dz} A_j = in_2 k_j \sum_{mnl} \frac{A_m A_n^* A_l}{1 - i\tau\omega_{mn}}$$

wherein:

$A_j$ is the amplitude of the jth field,
i is the imaginary operator, $(-1)^{\frac{1}{2}}$
$n_2$ is the Kerr media characteristic constant,
$k_j$ is the free-space vector for the jth field,
m is a first input mode identification subscript,
n is a second input mode identification subscript,
l is a third input mode identification subscript,
$A_m$ is the amplitude of the mth field,
$A_n$ is the amplitude of the nth field,
$A_l$ is the amplitude of the lth field,
$\tau$ is the relaxation constant of the nonlinear Kerr material, and
$\omega_{mn}$ is the difference in frequency between the mth and nth fields;

selecting a saturating and energy frequency shift enabling length of energy propagation in said Kerr media, a length inclusive of generating of a Kerr media characteristic constant determined single frequency output beam from said media.

2. The method of claim 1 wherein said input laser optical beam is a multimodal laser beam and said output beam is a single moded beam of reduced linewidth with respect to said input beam.

3. The method of claim 2 wherein said Kerr media characteristic constant $n_2$ has a positive value and said output beam single mode is the lowest frequency mode of said multimodal input beam.

4. The method of claim 2 wherein said Kerr media characteristic constant $n_2$ has a negative value and said output beam single mode is the highest frequency mode of said multimodal input beam.

5. The method of claim 2 wherein said Kerr media has a characteristic constant $n_2$ of positive numeric value.

6. The method of claim 5 wherein said Kerr media includes liquid carbon disulfide.

7. The method of claim 2 wherein said Kerr media has a selected length of two centimeters, a time constant $\tau$ of $10E^{-12}$, and a characteristic constant $n_2$ of positive value.

8. The method of claim 2 wherein said input laser optical beam energy includes equally spaced modes and an input mode separation between the last mode and the central mode equal to $1/\tau$.

9. The method of claim 2 wherein said input laser optical beam energy includes unequally spaced modes.

10. The method of claim 9 further including the step of intensity cascading the energy of remote and centrally disposed of said unequally spaced input energy modes through cycles of growth followed by depletion in each of a plurality of intervening input energy modes.

11. The method of claim 10 wherein said intensity cascading is terminated at a predetermined premature propagation distance in said Kerr media wherein a cascaded portion of said input optical beam energy is residing in a predetermined intermediate of said input modes.

12. The method of claim 10 wherein said intensity cascading is continued until said input beam energy resides in a predetermined one of the highest frequency and lowest frequency modes of said input optical beam energy.

13. The method for line narrowing input optical beam energy of multiple mode content into a single selected mode of the high frequency and low frequency modes of said input optical beam comprising the steps of:

communicating said multiple frequency input energy into a nonlinear refraction index moving grating Kerr media of predetermined finite response time and a selected one of a positive and a negative Kerr constant characteristics, for propagation therein; and selecting an energy mode shift enabling length of energy propagation in said Kerr media, a length inclusive of generating one of a Kerr media characteristic constant determined low ordered or high ordered mode disposed output beam of energy from said Kerr media.

14. The method for segregating one optical frequency component from the multiple components of an input beam comprising the steps of:

communicating said multiple frequency componented input energy into a nonlinear refractory index moving grating Kerr media of predetermined finite response time and selected one of positive and negative Kerr constant characteristics, for propagation therein; and extracting energy of one optical frequency from said Kerr media of a predetermined propagation distance along the length thereof.

* * * * *

UNITED STATES PATENT AND TRADEMARK OFFICE
CERTIFICATE OF CORRECTION

PATENT NO. :    5,166,942
DATED      :    November 24, 1992
INVENTOR(S) :   David Cardimona et al It is certified that error appears in the above-identified patent and that said Letters Patent is hereby corrected as shown below:

Column 2, line 16, "Positioned" should not be capitalized.
    Column 3, line 49, the comma should be deleted.
    Column 7, line 33, "$\neq$" should be -- $\pm$ --.
    Column 7, line 55, "I=" should be -- I$\equiv$ --.
    Column 9, line 23, "$\Delta\int\tau$" should be -- $\Delta\omega\tau$ --.
    Column 9, line 61, a space should follow "or".
    Column 11, line 14, "referred" should be -- preferred --.

Signed and Sealed this

Twenty-first Day of December, 1993

Attest:

BRUCE LEHMAN

*Attesting Officer*          *Commissioner of Patents and Trademarks*